Patented Dec. 31, 1935

2,025,807

UNITED STATES PATENT OFFICE 2,025,807

PROCESS FOR PRODUCING CERTAIN OXIDATION PRODUCTS OF CASTOR OIL AND THE LIKE

Melvin De Groote, St. Louis, and Bernhard Keiser, Webster Groves, Mo., assignors to Tretolite Company, Webster Groves, Mo., a corporation of Missouri No Drawing. Application January 30, 1935, Serial No. 4,090

5 Claims. (Cl. 87—12)

This invention relates to the manufacture of certain oxidation products of castor oil and the like, i. e., products obtained or produced by the oxidation of castor oil or castor oil bodies at a relatively low temperature and at a pressure of not over 125 lbs.

The object of our invention is to provide a novel process for producing products or materials of the kind mentioned. Briefly described, our process consists in subjecting castor oil or the like to pressure oxidation in the presence of an auto-oxidizer-catalyst consisting of a hendecenoic acid body.

In order to clearly define and explain our invention, it will be necessary to refer briefly to prior processes or procedures that have been employed or suggested to obtain products or materials produced by the oxidation or blowing of various oils with dry or moist air or oxygen. In a general way, animal or vegetable oils may be divided into five general classes, based on their susceptibility to oxidation reactions, involving the use of air or oxygen. The first of the above-mentioned classes includes such materials as stearic acid, which does not contain an ethylene linkage and is not saturated. Such a fatty body is not susceptible to oxidation by the conventional methods.

The second of the above-mentioned classes is unique, in that the only material or materials of said class that are commercially available, are castor oil and simple castor oil derivatives, such as ricinoleic acid, or poly-ricinoleic acid. Castor oil is characterized by the fact that it may be exposed to air or oxygen for a long time in a very thin film, without absorbing any oxygen. In other words, notwithstanding the fact that castor oil contains an ethylene linkage, still, so far as reactions at ordinary temperatures or pressures are concerned, it is hardly more reactive towards air or oxygen than if it were a saturated fatty body, such as stearin, or stearic acid.

The third of the above-mentioned classes of materials includes the so-called non-drying oils. These oils, such as oleic acid, olein, etc. are non-drying in the sense that they do not absorb oxygen and dry quickly enough to produce a paint film. However, they are differentiated from castor oil, in that a film exposed to air or oxygen at ordinary temperatures for a period of time, will oxidize slowly but rather completely.

The fourth of the above-mentioned classes of materials consists of the so-called semi-drying oils, such as cotton seed oil, and certain marine oils which are more reactive than oleic acid or the like, but not so reactive as the true drying oils, which are characterized, for example, by linseed oil.

The fifth of the above-mentioned classes of materials comprises the true drying oils which absorb air or oxygen rapidly enough to produce a paint film when exposed in a thin layer and which may absorb oxygen rapidly enough at ordinary temperatures to cause spontaneous combustion.

It is common practice to blow or oxidize various fatty materials of the kind above enumerated to produce materials intended for use in various arts. Linseed oil, for example, is oxidized to produce a solid, such as linoxyn. Certain oils are oxidized to produce plasticizers for use in the manufacture of artificial leather and the like. Certain oils are oxidized, so as to give miscibility with petroleum oils to produce blended lubricating oils. Certain oils are oxidized to produce a product of certain desired characteristics employed in the manufacture of varnish and the like.

It is well known that an oxidation process or procedure, which may be suitable for one of the five general classes of oils, previously mentioned, may not be suitable for a different class. For example, the process used to oxidize the linseed oil type of oil are usually ineffective in regard to castor oil, or even in regard to oleic acid, and the processes employed for oxidizing olive oil or rape seed oil, may be entirely too drastic for use on linseed oil. Moreover, in the oxidation of oils, particularly linseed oil, and certain marine oils, the resultant product depends entirely on the mode of treatment. Marine oils, for example, may be oxidized primarily to decolorize or deodorize the oil, and such oxidation is intended solely to oxidize or destroy the impurities so as to permit the oil under treatment to remain more or less unchanged.

In the co-pending application for patent of the present applicants jointly with Arthur F. Wirtel, Serial No. 752,718, filed November 12, 1934, there is disclosed a process for producing blown oils, that involves subjecting fatty bodies to oxidation after admixture with a relatively small amount of a vegetable oil of the true drying type, with or without a small amount of a fat splitting sulfonic acid.

In another co-pending application for patent filed by the above-mentioned applicants, Serial No. 760,031, filed December 31, 1934, there is disclosed a process for producing polyketo fatty bodies or polyaldehydic fatty bodies, that involves the oxidation of castor oil, polyricinoleic or ricinoleic acid under pressure at a relatively low temperature. The temperature employed in the said process is below the temperature at which castor oil can be oxidized under ordinary conditions, for instance, it is less than 150° C., and generally speaking, the oxidation is conducted at approximately 120° C. gauge pressure. The pressure employed in the said process varies from 25 to 125 lbs., the pressure most conveniently employed being about 45 lbs. In the above-mentioned low-temperature-low-pressure process, the reaction takes place primarily, due to the presence of a catalyst, which consists of a true drying oil, such as linseed oil. Usually, the castor oil body, before being subjected to low temperature pressure oxidation, is mixed with not over 20% of linseed oil. In the absence of linseed oil, either the reaction does not take place, or the reaction takes place so slowly that such oxidation procedure would not be feasible or economical, or might even produce some other compound. In a general way, oxidation of a mixture of 90% castor oil and 10% of linseed oil takes place very readily at a temperature of 120° C. and 45 lbs. air pressure. Such reaction may be completed in ten hours or less, depending upon the size of pressure vessel used during oxidation. The air, employed may be dried or moist, in the sense that it may carry its normal moisture content.

Castor oil is differentiated from other oils and other fatty materials in regard to its reaction towards oxidation in various manners. As has been previously pointed out, castor oil, although containing an ethylene linkage, does not oxidize under ordinary conditions, even after long exposure in a thin film. For this reason it is even less reactive than ordinary so-called non-drying oils. Its action is more analogous, so far as oxidation goes, to inert oils of the stearic acid type. Castor oil or ricinoleic acid or the related esters, such as the ethyl, methyl, propyl, or butyl ester, are further distinguished by the fact that the materials contain an alcoholiform hydroxyl, and thus, ricinoleic acid is not only a fatty acid, but is also a fatty alcohol and is more properly described, perhaps, as an alcohol acid. Such materials which are characterized by the presence of a ricinoleic acid radical will be referred to as castor oil bodies because they are invariably derived from castor oil as an original raw material. It is a secondary alcohol, and as is well known, the oxidation of a secondary alcohol produces a ketone, and thus, it is believed that the cautious oxidation of castor oil in the manner described in the said De Groote et al. application Serial No. 760,031, results in the formation of keto acids or keto acid bodies, and particularly, in the formation of polyketo acid bodies. It is true that the fatty bodies thus obtained may actually be aldehydic fatty bodies and not keto fatty bodies, although both are characterized by a reactive carbonyl radical.

We believe that the linseed oil present during the oxidation of castor oil, as described in the said De Groote et al. application Serial No. 760,031, acts in part as an auto-oxidizer, and acts in part as an oxidation catalyst. Without attempting to elaborate as to the working mechanism of an auto-oxidizer (see "Catalysis in Organic Chemistry", Sabatier & Reid, 1923, pages 46 and 47), it is sufficient to state that an auto-oxidizer in a general manner, oxidizes in proportion to its own mass, and it does not emerge unchanged from the reaction which it has caused. On the other hand, the addition of linseed oil, for example, to castor oil, does not hasten the reaction directly in proportion to the added linseed oil. For instance, an 80–20 mixture does not necessarily oxidize twice as rapidly as a 90–10 mixture. Furthermore, it is well known that some auto-oxidizers may be entirely regenerated and again serve as a carrier of free oxygen to the oxidizable substance. It is further possible that the oxidation of linseed oil or any other added material may result in certain new products, which, in turn, may act as auto-oxidizers or as oxidation catalysts. Accordingly, in the said De Groote et al. application Serial No. 760,031, the linseed oil used in the process is referred to as an auto-oxidizer catalyst, with the understanding that the reaction may be promoted by the linseed oil or some product therefrom acting either in the capacity of an auto-oxidizer or in the capacity of an oxidation catalyst, or in a dual capacity. As far as the commercial operation of such oxidation reactions are concerned, it is obvious that these materials may be added in the designated proportion and the mixture summitted to oxidation under the described conditions, so as to obtain the advantages described, without reference as to the theoretical aspects of the oxidation step itself.

We have found that while certain materials will act as auto-oxidizer-catalysts, so as to promote the cautious and controlled oxidation of castor oil or the like at relatively low temperatures and under moderate pressures of the kind described, there does not appear to be any general characteristic whereby this particular property of a substance may be anticipated. Materials which may serve as auto-oxidizers or catalysts in regard to other reactions may not have any effect in hastening the oxidation of castor oil under the described conditions. Likewise, materials which may be effective in hastening the oxidation of castor oil, under the conditions described, may not be effective in other reactions where it is known that some other auto-oxidizer-catalysts may be employed. At least, at the present time and in regard to the low temperature pressure oxidation of castor oil bodies, it appears that this peculiar property is that of an individual substance or compound, and cannot be ascribed to a class broadly, as far as we are now aware.

We have also found that hendecenoic acid is a very effective auto-oxidizer-catalyst, when employed in low temperature pressure oxidation of castor oil bodies. Accordingly, we have devised a novel process for producing certain oxidation products of castor oil and the like that involves subjecting a castor oil body, such as castor oil, ricinoleic acid or polyricinoleic acid, to oxidation at a temperature of not over 140° C. and at a pressure of not over 125 lbs. in the presence of a hendecenoic acid body. Hendecenoic acid is derived by the pyrolysis of ricinoleic acid, so as to yield hendecenoic acid and heptaldehyde. The method of producing said acid is well known and is described in the publication "Dictionary of Applied Chemistry", Thorpe, 1922, volume 4, pages 630–31. In the said publication hendecenoic acid $(C_{11}H_{20}O_2)$ is erroneously referred to as "hendecatoic acid". See also volume 3, page 15, of the same publication. Hendecenoic acid is sometimes referred to as undecylenic acid. The glyceride of hendecenoic acid can be obtained by the dehydration of the glyceride of ricinoleic acid, i. e., by the dehydration of triricinolein. Obviously, instead of the acid itself, one may employ the glyceride as the auto-oxidizer-catalyst, because the desired property is possessed by the long chain hydrocarbon radical and not by the glyceryl radical, because glycerol or ordinary glycerides, such as olive oil, do not have the property of hastening or otherwise effecting oxidation. In practising our process we prefer to use the glyceride of hendecenoic acid; and said material need not necessarily be pure, but may be obtained in a semi-pure form by the dehydration of castor oil in the manner described in the Thorpe reference previously mentioned. In our process we use not over 20%, and preferably, approximately 10% of hedecenoic acid bodies, particularly the glyceride bodies obtained by dehydration of castor oil, as an auto-oxidizer-catalyst in the low temperature pressure oxidation of castor oil, so as to produce oxidation products of the kind which appear to be polyketo or polyaldehydo fatty bodies. We prefer that the oxidation be conducted with air having its normal moisture content and at a temperture of 120° C. and at a pressure of 45 lbs.

Having thus described our invention, what we claim and desire to secure by Letters Patent is:

1. A process for the purpose described, which consists in substantially oxidizing castor oil by means of air of normal moisture content at a temperature within the range of approximately 120° C. to 150° C. and at a gauge pressure within the range of 25 lbs. to 125 lbs., and using 10% to 20%, by weight, of hendecenoic acid glyceride as an auto-oxidizer-catalyst.

2. A process for the purpose described, which consists in substantially oxidizing castor oil by means of air of normal moisture content at a temperature of approximately 120° C. and under a gauge pressure of 45 lbs., and using as an auto-oxidizer-catalyst, the hendecenoic acid glyceride obtained by dehydration of triricinolein, said hendecenoic glyceride being equivalent in weight to 10% of the castor oil being oxidized.

3. A process for the purpose described, characterized by substantially oxidizing, by means of gaseous, oxygen-containing medium, a castor oil body at a temperature within the range of approximately 120° C. to 150° C. and at a gauge pressure within the range of 25 lbs. to 125 lbs. and using 10% to 20%, by weight, of a hendecenoic acid body as an auto-oxidizer-catalyst, said castor oil body being characterized by the presence of a ricinoleic acid radical.

4. A process for the purpose described, characterized by substantially oxidizing, by means of a gaseous, oxygen-containing medium, castor oil at a temperature within the range of approximately 120° C. to 150° C. and at a gauge pressure within the range of 25 lbs. to 125 lbs., and using 10% to 20%, by weight, of a hendecenoic acid body as an auto-oxidizer-catalyst.

5. A process for the purpose described, characterized by substantially oxidizing, by means of a gaseous, oxygen-containing medium, castor oil at a temperature within the range of approximately 120° C. to 150° C. and at a gauge pressure within the range of 25 lbs. to 125 lbs., and using 10% to 20%, by weight, of hendecenoic acid glyceride as an auto-oxidizer-catalyst.

MELVIN DE GROOTE.
BERNHARD KEISER.